US009832560B1

(12) United States Patent
Bagga et al.

(10) Patent No.: US 9,832,560 B1
(45) Date of Patent: Nov. 28, 2017

(54) HEADSET PROVIDING PRIVATE AND DETACHABLE LOUDSPEAKER AUDIO AND EXTERNAL DEVICE CHARGING

(71) Applicants: Ajay Bagga, East Elmhurst, NY (US); Mehak Kapoor, East Elmhurst, NY (US); Parve Bagga, East Elmhurst, NY (US)

(72) Inventors: Ajay Bagga, East Elmhurst, NY (US); Mehak Kapoor, East Elmhurst, NY (US); Parve Bagga, East Elmhurst, NY (US)

(*) Notice: Subject to any disclaimer, the term of this patent is extended or adjusted under 35 U.S.C. 154(b) by 0 days.

(21) Appl. No.: 15/214,862

(22) Filed: Jul. 20, 2016

Related U.S. Application Data

(60) Provisional application No. 62/389,645, filed on Mar. 4, 2016.

(51) Int. Cl.
*H04R 1/10* (2006.01)
*H02J 7/00* (2006.01)

(52) U.S. Cl.
CPC .......... *H04R 1/1041* (2013.01); *H02J 7/0045* (2013.01); *H02J 7/0052* (2013.01); *H04R 1/1008* (2013.01); *H04R 1/1025* (2013.01); *H04R 1/1066* (2013.01); *H02J 2007/0062* (2013.01); *H04R 2420/07* (2013.01); *H04R 2420/09* (2013.01)

(58) Field of Classification Search
CPC .. H04R 1/1041; H04R 1/1008; H04R 1/1025; H04R 1/1066; H04R 2420/07; H04R 2420/09; H02J 7/0045; H02J 7/0052; H02J 2007/0062
See application file for complete search history.

(56) References Cited

U.S. PATENT DOCUMENTS

| | | | |
|---|---|---|---|
| 7,388,960 B2* | 6/2008 | Kuo | H04R 1/1041 379/430 |
| 7,825,626 B2 | 11/2010 | Kozisek | |
| 8,085,966 B2* | 12/2011 | Amsel | H04R 1/025 381/184 |
| 8,142,230 B2* | 3/2012 | Li | H04R 1/025 439/638 |
| 8,605,931 B2 | 12/2013 | Amsel | |
| 8,620,007 B2 | 12/2013 | Lee et al. | |
| 8,774,420 B2 | 7/2014 | Belafonte et al. | |
| 2005/0255895 A1 | 11/2005 | Lee et al. | |

(Continued)

*Primary Examiner* — Brenda Bernardi
(74) *Attorney, Agent, or Firm* — H. John Rizvi; Gold & Rizvi, P.A.

(57) ABSTRACT

Disclosed is a headset for playing audio and charging an external electronic device. The headset includes a first earpiece including a first inner speaker and a first outer speaker, a second earpiece including a second inner speaker and a second outer speaker, a selector operable to select play modes, the play modes including a first play mode and a second play mode, the first play mode being configured to play audio via the inner speakers, the second play mode being configured to play audio via the outer speakers, and a chargeable power bank being configured to provide power through a power output jack. One or more of the speakers may include a chargeable power bank for providing power to an external device and/or a wireless communicator for receiving audio signals. One or more of the speakers may be detachably securable to a headband.

18 Claims, 9 Drawing Sheets

(56) References Cited

U.S. PATENT DOCUMENTS

| | | | |
|---|---|---|---|
| 2007/0258614 A1 | 11/2007 | Langberg | |
| 2008/0219491 A1* | 9/2008 | Ahuja | H04R 1/1075 |
| | | | 381/370 |
| 2010/0067714 A1 | 3/2010 | Cheng | |
| 2014/0126755 A1* | 5/2014 | Strasberg | H04R 5/033 |
| | | | 381/309 |
| 2014/0341415 A1* | 11/2014 | Camello | H04R 1/10 |
| | | | 381/379 |
| 2014/0363016 A1 | 12/2014 | Blonder | |
| 2015/0124993 A1* | 5/2015 | Saideh | H04R 1/1033 |
| | | | 381/74 |
| 2015/0312666 A1* | 10/2015 | Park | H04R 1/1041 |
| | | | 381/74 |
| 2016/0088383 A1* | 3/2016 | Yan | H04R 5/0335 |
| | | | 381/378 |

\* cited by examiner

HEADSET PROVIDING PRIVATE AND DETACHABLE LOUDSPEAKER AUDIO AND EXTERNAL DEVICE CHARGING

CROSS-REFERENCE TO RELATED APPLICATION

This application claims the benefit of U.S. Provisional Patent Application Ser. No. 62/389,645, filed Mar. 4, 2016, which is incorporated herein in its entirety.

FIELD OF THE INVENTION

The present invention relates generally to audio devices, and more particularly, to a headset for playing audio and charging an external electronic device.

BACKGROUND OF THE INVENTION

Common headsets allow users to listen to audio privately. For example, via a common headset, a user may privately listen to audio that is received from an electronic device such as a portable music player.

Further, it is common for audio listeners to listen to music through loudspeakers. For example, loudspeakers are commonly found in household devices such as televisions and stereo systems.

Furthermore, it is common for consumers to desire the ability to charge electronic devices while traveling, or without access to an electrical wall socket.

However, current devices are unable to effectively and conveniently serve the above needs or desires. As such, there exists a need for a device that effectively and conveniently provides private audio listening, loudspeaker audio listening, and external device charging.

SUMMARY OF THE INVENTION

A headset for playing audio and charging an external electronic device is disclosed, the headset comprising, a first earpiece including a first inner speaker and a first outer speaker, a second earpiece including a second inner speaker, a selector operable to select play modes, the play modes including a first play mode and a second play mode, the first play mode being configured to play audio via the inner speakers, the second play mode being configured to play audio via the outer speaker, and a chargeable power bank being configured to provide power through a power output jack.

In another aspect, at least one of the inner speakers is fixedly attached to a support structure and the outer speaker is detachably securable to the support structure, the outer speaker being configured to play audio in a detached state.

In another aspect, the outer speaker is fixedly attached to a support structure and at least one of the inner speakers is detachably securable to the support structure, the at least one of the inner speakers being configured to play audio in a detached state.

In another aspect, at least one of the earpieces is detachably securable to a support structure, the at least one of the earpieces being configured to play audio in a detached state.

In another aspect, the outer speaker is fixedly attached to at least one of the inner speakers.

In another aspect, at least one of the inner speakers is fixedly attached to a support structure, the chargeable power bank and the power output jack being detachably securable to the support structure.

In another aspect, at least one of the inner speakers is fixedly attached to a support structure and the outer speaker is detachably securable to the support structure, the outer speaker including the chargeable power bank and the power output jack.

In another aspect, the outer speaker is fixedly attached to a support structure and at least one of the inner speakers is detachably securable to the support structure, the at least one of the inner speakers including the chargeable power bank and the power output jack.

In another aspect, at least one of the earpieces includes the chargeable power bank and the power output jack.

In another aspect, at least one of the earpieces is detachably securable to a support structure, the at least one of the earpieces including the chargeable power bank and the power output jack.

In another aspect, the headset further comprises, a wireless communicator being configured to wirelessly receive audio signals.

In another aspect, the power output jack is a USB receptacle.

A headset for playing audio and charging an external electronic device is disclosed, the headset comprising, a support structure a first earpiece including a first inner speaker assembly and a first outer speaker assembly a second earpiece including a second inner speaker assembly and a second outer speaker assembly a selector operable to select play modes, the play modes including a first play mode and a second play mode the first play mode being configured to play audio via the inner speaker assemblies the second play mode being configured to play audio via the outer speaker assemblies and a chargeable power bank being configured to provide power through a power output jack.

In another aspect, the inner speaker assemblies are fixedly attached to the support structure and the outer speaker assemblies are detachably securable to the support structure, at least one of the outer speaker assemblies being configured to play audio as a portable speaker in a detached state, at least one of the outer speaker assemblies including the chargeable power bank and the power output jack.

In another aspect, the outer speaker assemblies are fixedly attached to the support structure and the inner speaker assemblies are detachably securable to the support structure, at least one of the inner speaker assemblies being configured to play audio as a portable speaker in a detached state, at least one of the inner speaker assemblies including the chargeable power bank and the power output jack.

In another aspect, the earpieces are detachably securable to the support structure, at least one of the earpieces being configured to play audio in a detached state, at least one of the earpieces including the chargeable power bank and the power output jack.

In another aspect, the outer speaker assemblies are fixedly attached to the inner speaker assemblies.

In another aspect, at least one of the speaker assemblies is detachably securable to the support structure, the at least one of the speaker assemblies including a wireless communicator being configured to wirelessly receive audio signals for playing received audio signals via the at least one of the speaker assemblies.

A headset for playing private and loudspeaker audio and charging an external electronic device is disclosed, the headset comprising, a support structure, the support structure including a headband a first earpiece including a first inner speaker assembly and a first outer speaker assembly a second earpiece including a second inner speaker assembly and a second outer speaker assembly a selector operable to select play modes, the play modes including a first play mode and a second play mode the first play mode being configured to play audio via the inner speaker assemblies the second play mode being configured to play audio via the outer speaker assemblies, and the inner speaker assemblies being fixedly attached to the support structure and the outer speaker assemblies being detachably securable to the support structure, at least one of the outer speaker assemblies being configured to play audio as a portable speaker in a detached state, at least one of the outer speaker assemblies including a chargeable power bank being configured to provide power through a power output jack.

In another aspect, at least one of the outer speaker assemblies includes a wireless communicator being configured to wirelessly receive audio signals for playing received audio signals via the at least one of the outer speaker assemblies as a portable speaker.

These and other objects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, where like designations denote like elements, and in which.

Like reference numerals refer to like parts throughout the several views of the drawings.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
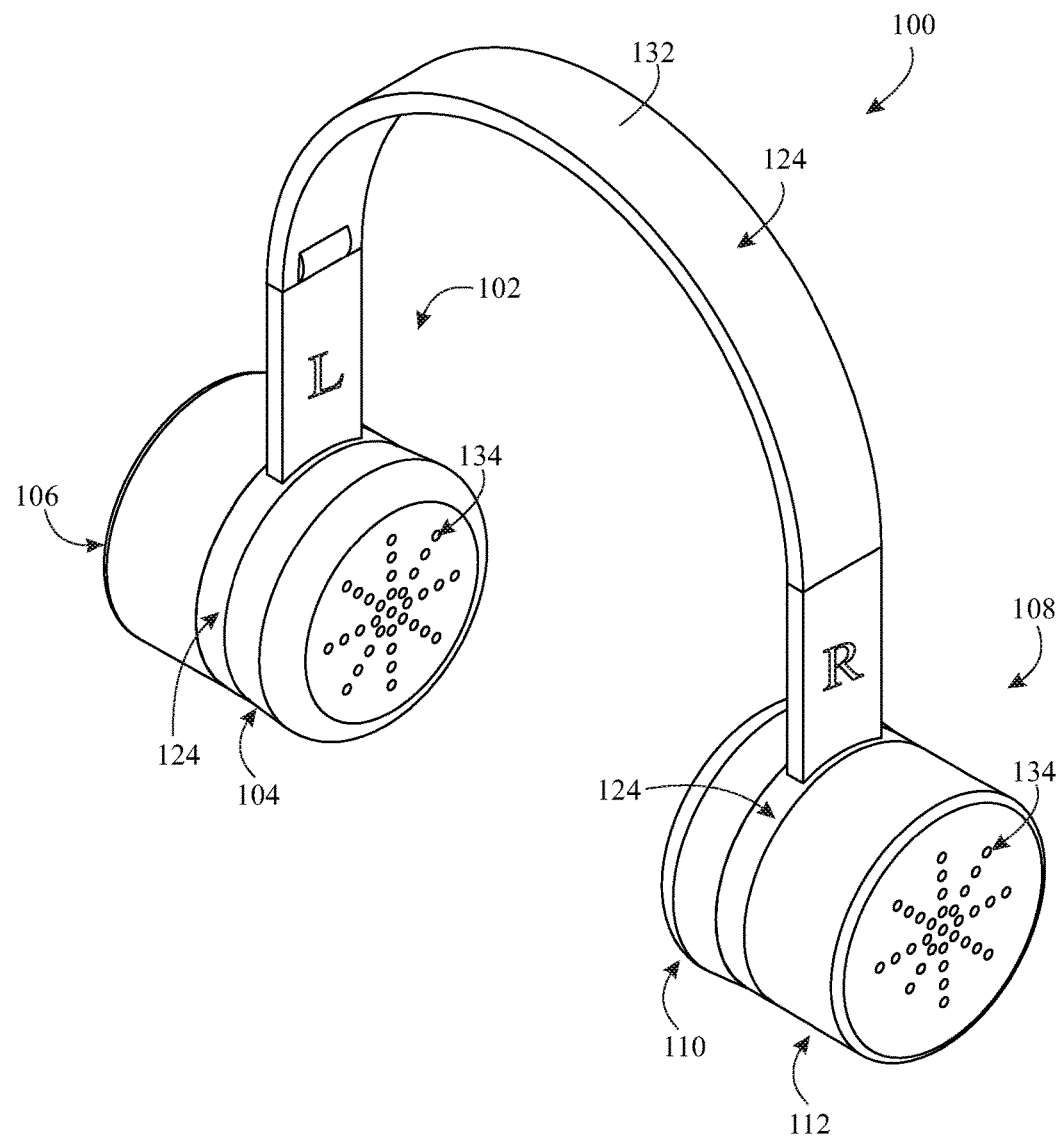
FIG. 1 presents an isometric front top view of a headset playing audio via inner speakers, in accordance with the disclosure.

The illustrations of FIGS. 1-9 show a headset 100 in accordance with the disclosure. More particularly, FIG. 1 shows the headset 100 including a first earpiece 102, the first earpiece 102 including a first inner speaker assembly 104 and a first outer speaker assembly 106. The headset 100 includes a second earpiece 108, the second earpiece 108 including a second inner speaker assembly 110 and a second outer speaker assembly 112. In some embodiments, the headset 100 may include only one outer speaker assembly disposed on either one of the earpieces. The speaker assemblies may each include a housing that operably supports a speaker allowing audio to play through the speaker. Such a housing may be detachably securable to the inner speaker assemblies, the outer speaker assemblies, or a support structure of the headset.

Figure 2:
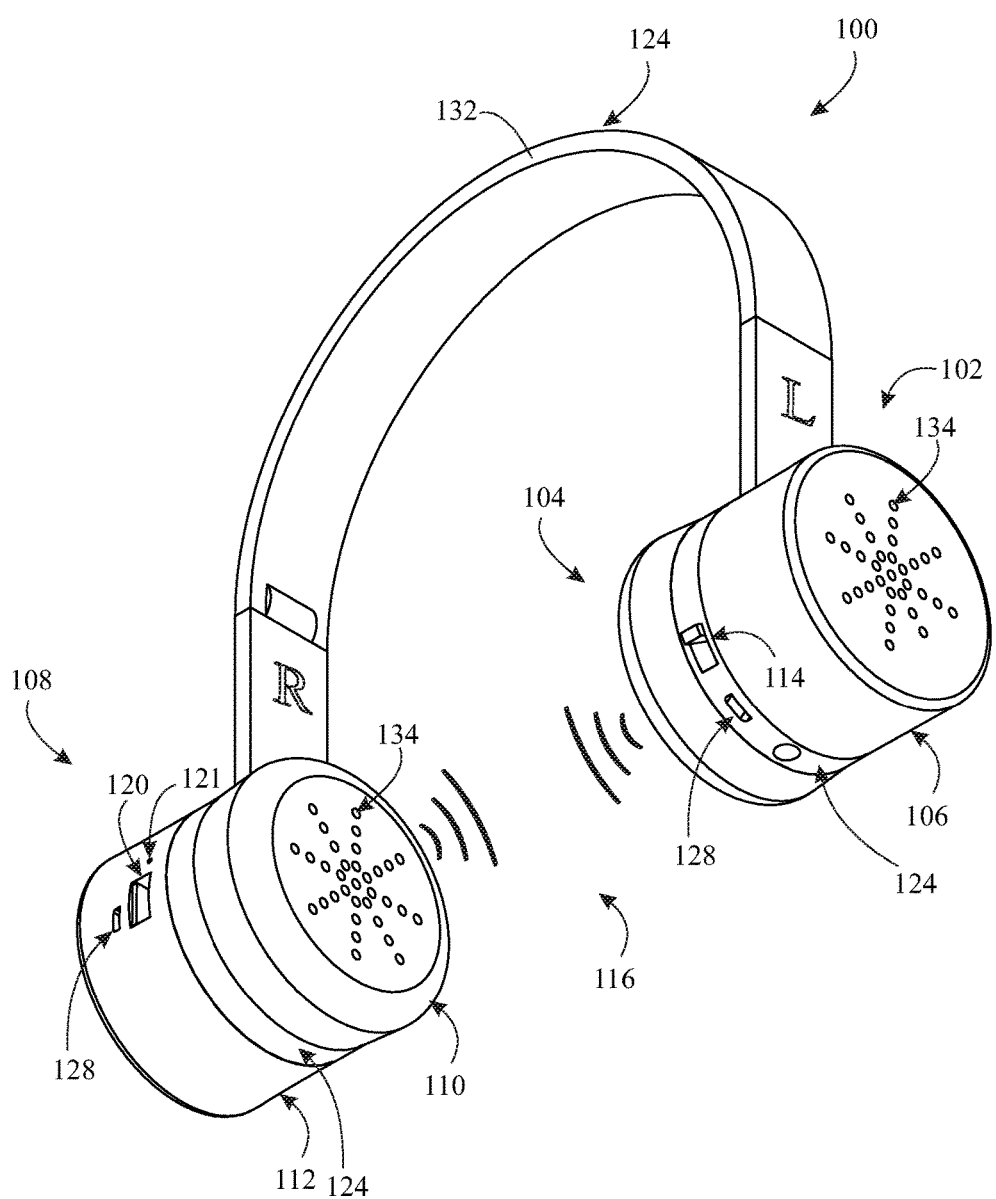
FIG. 2 presents an isometric rear bottom view of the headset of FIG. 1 playing audio via inner speakers, in accordance with the disclosure.
Figure 3:
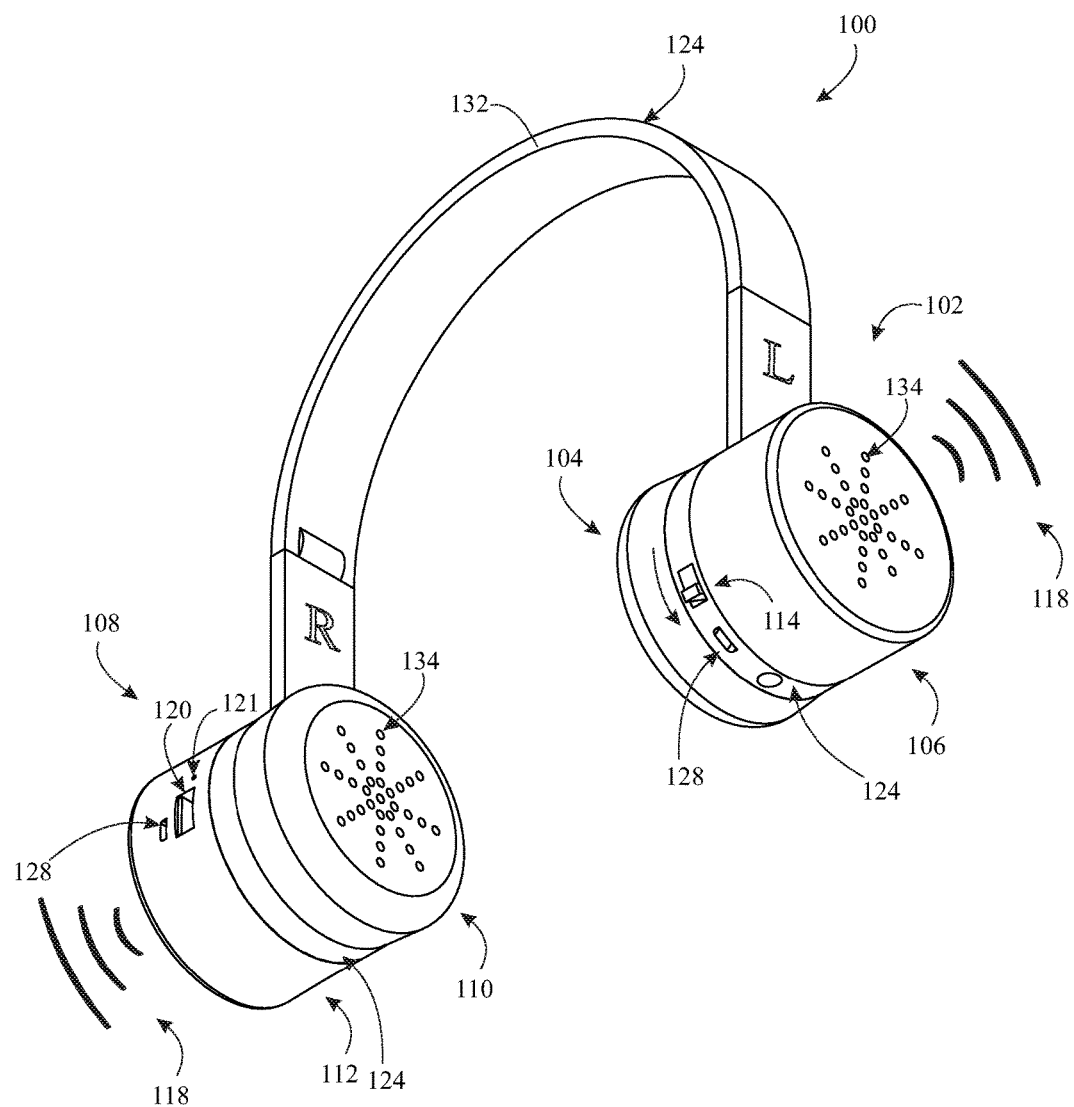
FIG. 3 presents an isometric rear bottom view of the headset of FIG. 1 playing audio via outer speakers, in accordance with the disclosure.

The headset 100 further includes a selector 114 (FIGS. 2-3) that is operable to select play modes, the play modes including a first play mode 116 shown in FIG. 2 and a second play mode 118 shown in FIG. 3. The selector 114 may be a physical switch or button, or may be a digital or virtual switch or button. The selector 114 may be manually operable by a user's hand or finger by flipping a switch as shown in FIG. 3, where the selector 114 is switched from selecting the first play mode 116 of FIG. 2 to the second play mode 118 of FIG. 3. Although the selector 114 is shown externally disposed on the headset 100 for operation, the selector 114 may be disposed internally, and may be digitally, wiredly, or wirelessly operable by an external device or control, and/or may be operable by moving, detaching, or rotating a structure of the headset 100. For example the play modes 116 and 118 may be selectable via a remote controller or wireless device such as a smart phone. The selector may be located on any of the speaker assemblies or a support structure as disclosed herein.

The first play mode 116 shown in FIG. 2 is configured to cause the headset 100 to play audio via the inner speaker assemblies 104 and 110. The second play mode 118 shown in FIG. 3 is configured to cause the headset 100 to play audio via one or both of the outer speaker assemblies. For example, the inner speaker assemblies may be configured for private audio listening or playing as commonly provided by existing headphones, and one or both of the outer speaker assemblies may be configured for open air loudspeaker listening. For example, the first play mode 116 may produce lower, near-ear, private volume and the second play mode 118 may produce public volumes that are audible across a room. The inner speaker assemblies 104 and 110 are configured to play audio directed inwardly towards each other and the outer speaker assemblies 106 and/or 112 may be configured to play audio directed outwardly away from each other or away from the headset 100 or the inner speaker assemblies.

Figure 6:
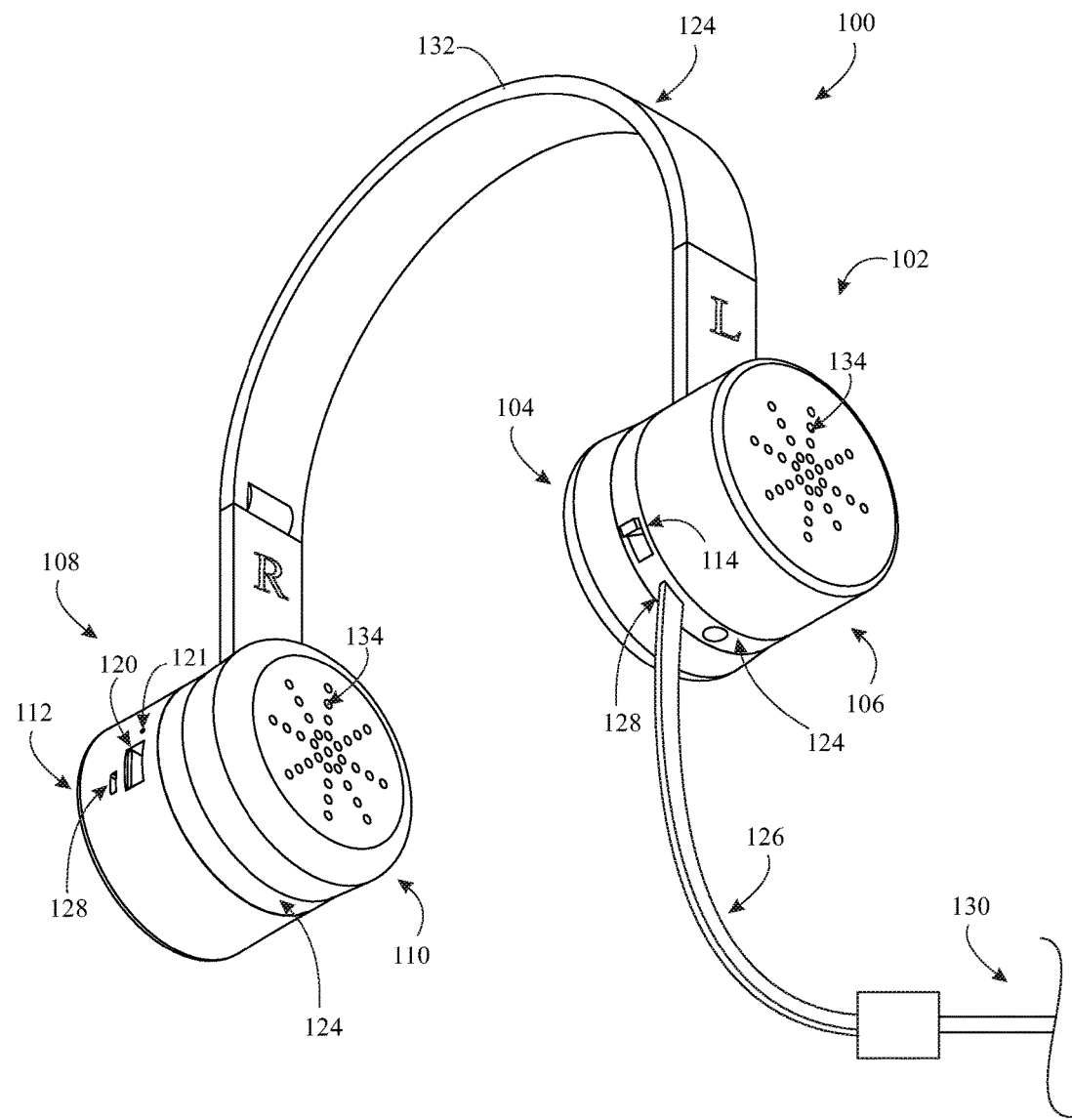
FIG. 6 presents an isometric rear bottom view of the headset of FIG. 1, showing a left speaker receiving power from an external power source, in accordance with the disclosure.
Figure 9:
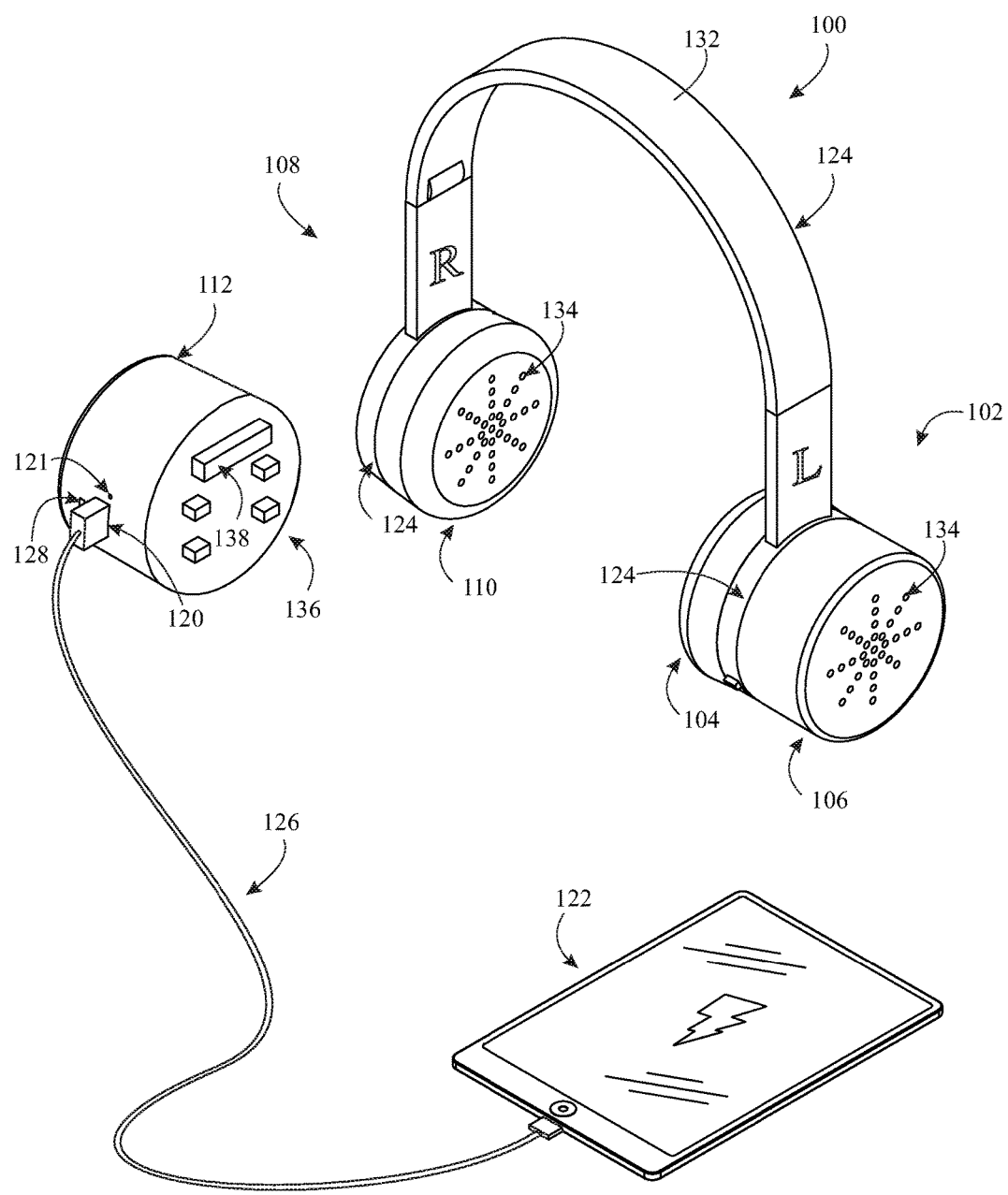
FIG. 9 presents an isometric rear top view of the headset of FIG. 1 where a detached right speaker assembly is charging an external electronic device, in accordance with the disclosure.

As shown in FIGS. 2, 3, 6, and 9, the headset 100 may include a chargeable power bank (not shown) being configured to provide power through a power output jack 120. For example, FIG. 9 shows the headset 100 charging an external device 122 through the power output jack 120 and through a charging cable 126 that is connected to the power output jack 120. The chargeable power bank may be a battery that is chargeable via a power input jack 128. For example, FIG. 6 shows the headset 100 receiving power from an external power source 130 through charging cable 126 and power input jack 128 for charging a chargeable power bank or battery of the headset 100. Power output jack 120 and/or power input jack 128 may be a USB receptacle such as a micro-USB receptacle, and may be located on one or more of the speaker assemblies or on a support structure 124 of the headset. The input or output jacks may be any appropriate USB receptacle or port that is configured to provide or receive power, control signals, and/or audio signals through a connector cable.

The chargeable power bank and the power output jack 120 may be included in any one or both of the earpieces, any one or both of the inner speaker assemblies, and/or any one or both of the outer speaker assemblies. For example, a chargeable power bank may be included in second outer speaker assembly 112 for charging an external electronic device 122 as a portable charger as shown in FIG. 9. It is to be understood that the chargeable power bank may be included in a housing that is detachably securable to one or both of the inner speaker assemblies, one or both of the outer speaker assemblies and/or a support structure of the headset (e.g. a headband). For example, the housing may or may not include a speaker. It is to be understood that the chargeable power bank may be configured to charge an electronic device in both a detachably secured state and a detached state of the chargeable power bank or a respective housing or speaker assembly which holds or includes the chargeable power bank.

Figure 8:
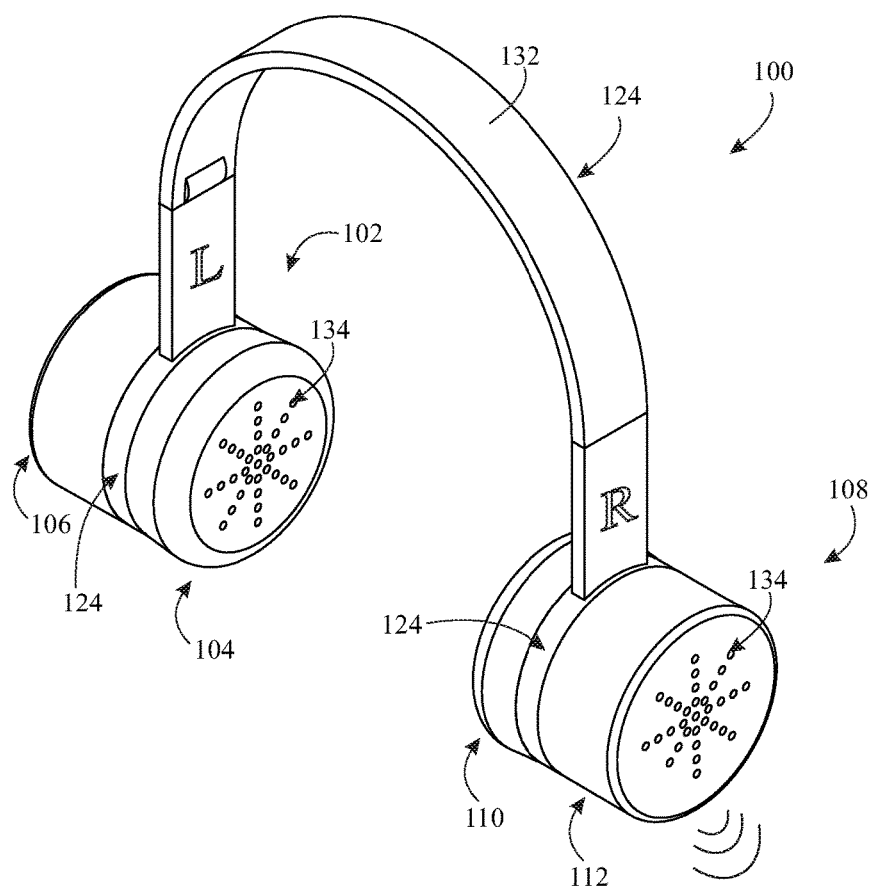
FIG. 8 presents an isometric front top view of the headset of FIG. 1 communicating wirelessly with an external device, in accordance with the disclosure.
Figure 8:
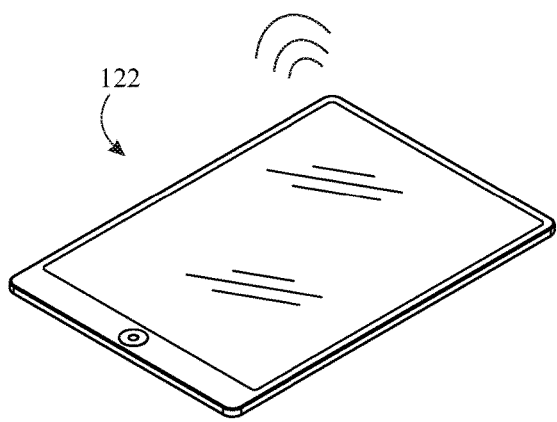

The headset 100 may include a wireless communicator (not shown) that is configured to wirelessly receive audio signals from an external device for playing received audio signals via at least one of the speaker assemblies. For example, any one or a plurality of the herein described speaker assemblies may include one wireless communicator. FIG. 8 shows the headset 100 wirelessly communicating with an external electronic device 122 via the wireless communicator. The wireless communicator may be configured to send audio signals to the external electronic device 122. For example, in some embodiments a microphone may be operatively connected to the headset for the headset to receive (e.g. record) microphone voice audio and subsequently send the microphone voice audio via the wireless communicator to the external electronic device 122 for further processing. It is to be understood that the microphone may be operatively connected wiredly or wirelessly to receive voice audio and subsequently send the voice audio via the wireless communicator. For example such a microphone configuration may be used to talk on a call that is active through external electronic device 122. The microphone may be wiredly connected to microphone input jack 121 shown in FIGS. 2-3, 6, and 9. The audio signals may be transformed between analog and digital formats accordingly to allow the speakers to play audio, or to send the microphone voice audio to the external electronic device, as known in the art. For example, various encoders/decoders may be employed to appropriately relay the audio signals as described herein. The external electronic device of FIG. 8 may be charged via the power output jack 120.

The headset 100 may include a support structure 124. The support structure 124 may include a headband 132. The headband 132 may be adjustable to accommodate various head sizes. The support structure 124 supports any speaker assembly that is fixedly or detachably secured to the support structure 124. For example, the support structure may support one or more of the herein described speaker assemblies to hold the speaker assemblies near a user's ear.

Figure 7:
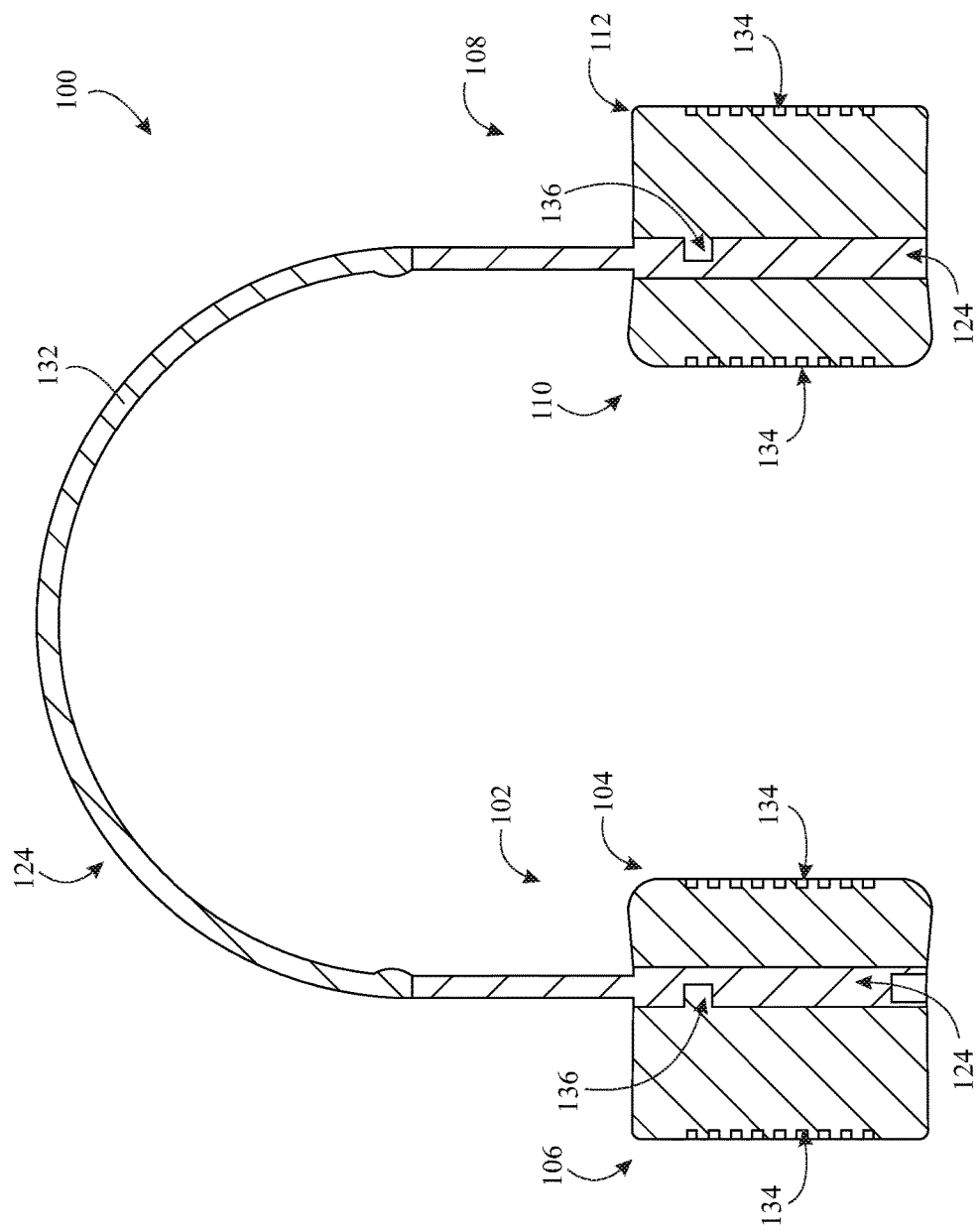
FIG. 7 presents a cross sectional elevated view of the headset of FIG. 1, the cross section taken along a length of a headband through a center of speakers of the headset, in accordance with the disclosure.

As shown in FIG. 7, one or more of the speaker assemblies may include holes 134 to allow sound to project through the one or more speaker assemblies.

Figure 4:
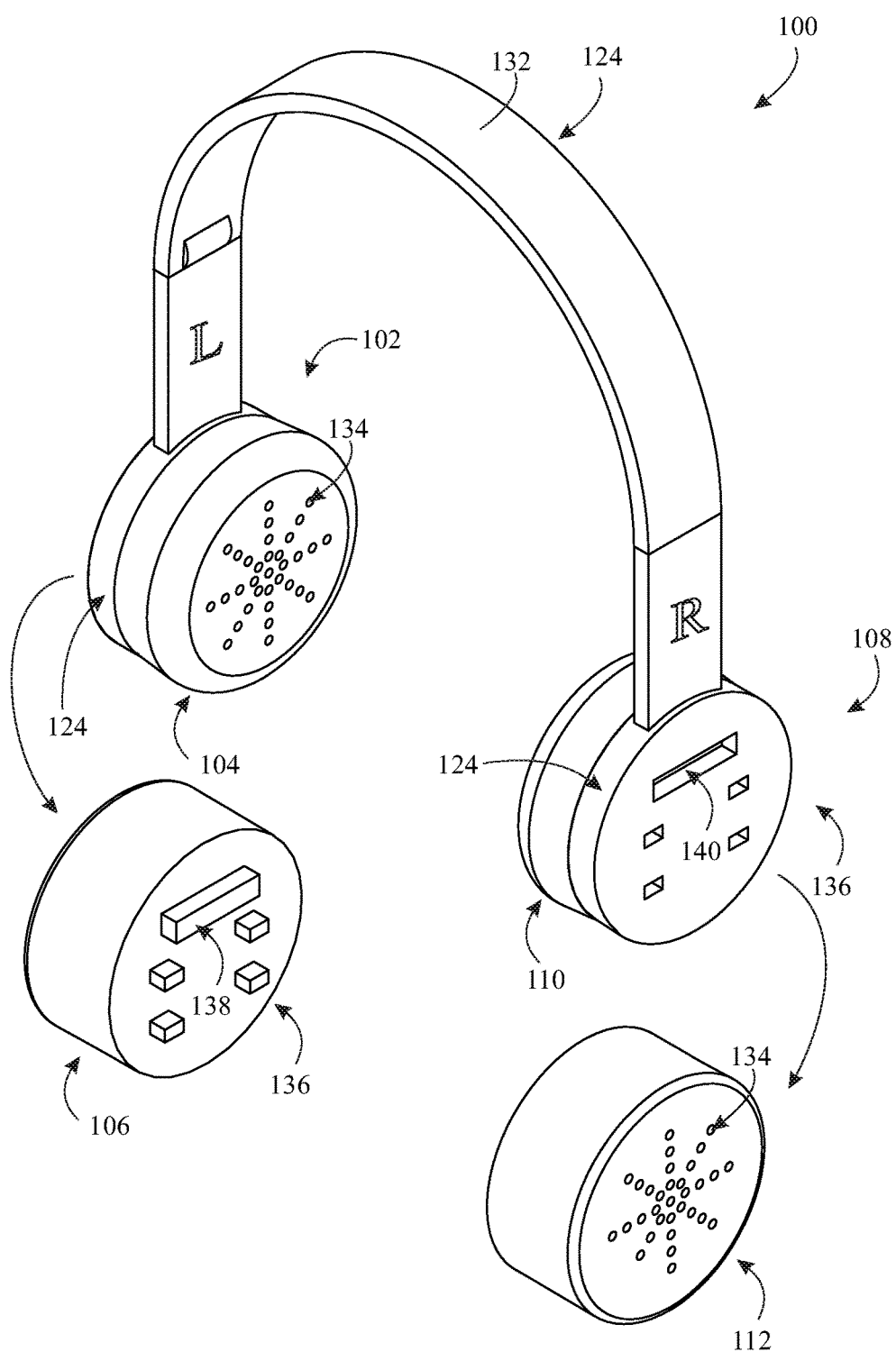
FIG. 4 presents an isometric front top view of the headset of FIG. 1, showing outer speaker assemblies being detached, in accordance with the disclosure.

As shown in FIG. 4, the speaker assemblies may include an electrical connection arrangement 136 configured to electrically connect the speaker assemblies to adjacent or other speaker assemblies and/or to the headset 100. For example, as shown in FIG. 4, the electrical connection arrangement 136 may include protruding elements 138 (e.g. pins) and receiving elements 140 (e.g. recessions). The protruding elements 138 may be arranged on an inner side of one or both outer speaker assemblies. For example the inner side of an outer speaker assembly is a side that is disposed adjacent the inner speaker assembly or the support structure when the outer speaker assembly is detachably secured or fixedly attached to the inner speaker assembly or the support structure. The receiving elements 140 may be arranged on an outer side of one or both inner speaker assemblies and/or an outer side or through the support structure 124. For example, the outer side of the inner speaker assembly may be a side that is disposed adjacent the outer speaker assembly or the support structure when the inner speaker assembly is detachably secured or fixedly attached to the outer speaker assembly or the support structure. An outer side of the support structure may be a side that is disposed adjacent a detachably secured outer speaker assembly. For example, FIG. 4 shows the receiving elements being disposed on the outer sides of the support structure and the protruding elements being disposed on the inner sides of the outer speaker assemblies. It is to be understood that in some embodiments the protruding elements and the receiving elements may have swapped positions with respect to FIG. 4. For example, the receiving elements may be disposed on a detachable speaker assembly and the protruding elements may be disposed on the support structure or the inner speaker assemblies. For example, the protruding elements may be located on the inner speaker assemblies and the receiving elements may instead be located on the outer speaker assemblies in a similar configuration. Any appropriate combination of protruding or receiving elements may be included in the electrical connection arrangement 136.

The protruding elements 138 are arranged to mate with the receiving elements 140 and vice-versa such that electrical and/or audio connection between the headset 100, the support structure 124, the outer speaker assemblies and/or the inner speaker assemblies is established upon mating. The receiving elements 140 may be slots. Upon connecting, power and/or audio signals may be transferred between one or more of the outer speaker assemblies and one or more of the inner speaker assemblies respectively. For example, a chargeable power bank may be located on an outer speaker assembly, whereupon mating with the inner speaker assembly and/or the support structure, the chargeable power bank may provide power to the inner speaker assembly. As such, a chargeable power bank located on a detachably securable speaker assembly may provide power and signals through the electrical connection arrangement to an adjacent mated receiving speaker assembly when the detachably securable speaker assembly is secured to the support structure and/or the receiving speaker assembly. Audio signals received at any of the speaker assemblies (e.g. from the wireless connector) may be transferred through the electrical connection arrangement 136 to a mated speaker assembly. The electrical connection arrangement is configured such that when an inner speaker assembly electrically mates with an outer speaker assembly the speaker assemblies are secured or attached flush against one another back to back, and/or flush with the support structure 124 as shown in the figures. Upon a speaker assembly detaching, the headset 100 may automatically switch to playing audio via the detaching or detached speaker assembly without the electrical connection arrangement being electrically secured. For example, playing audio may continuously transition from the first play mode and/or the second play mode to playing audio through a detached speaker assembly upon the mating of the electrical connection arrangement being broken. As such, when two or more of the speaker assemblies are electrically mated the play modes may be functional, and when the speaker assemblies are electrically un-mated the play modes may stop functioning and only a detached speaker assembly may play audio as a portable speaker.

The power output jack and/or the power input jack may be electrically connected through the support structure 124 to one or more electrically mated speaker assemblies via the electrical connection arrangement. In some embodiments the power input and/or output jacks are directly electrically connected to the electrical connection arrangement for receiving and providing power to electrically mated speaker assemblies.

Figure 5:
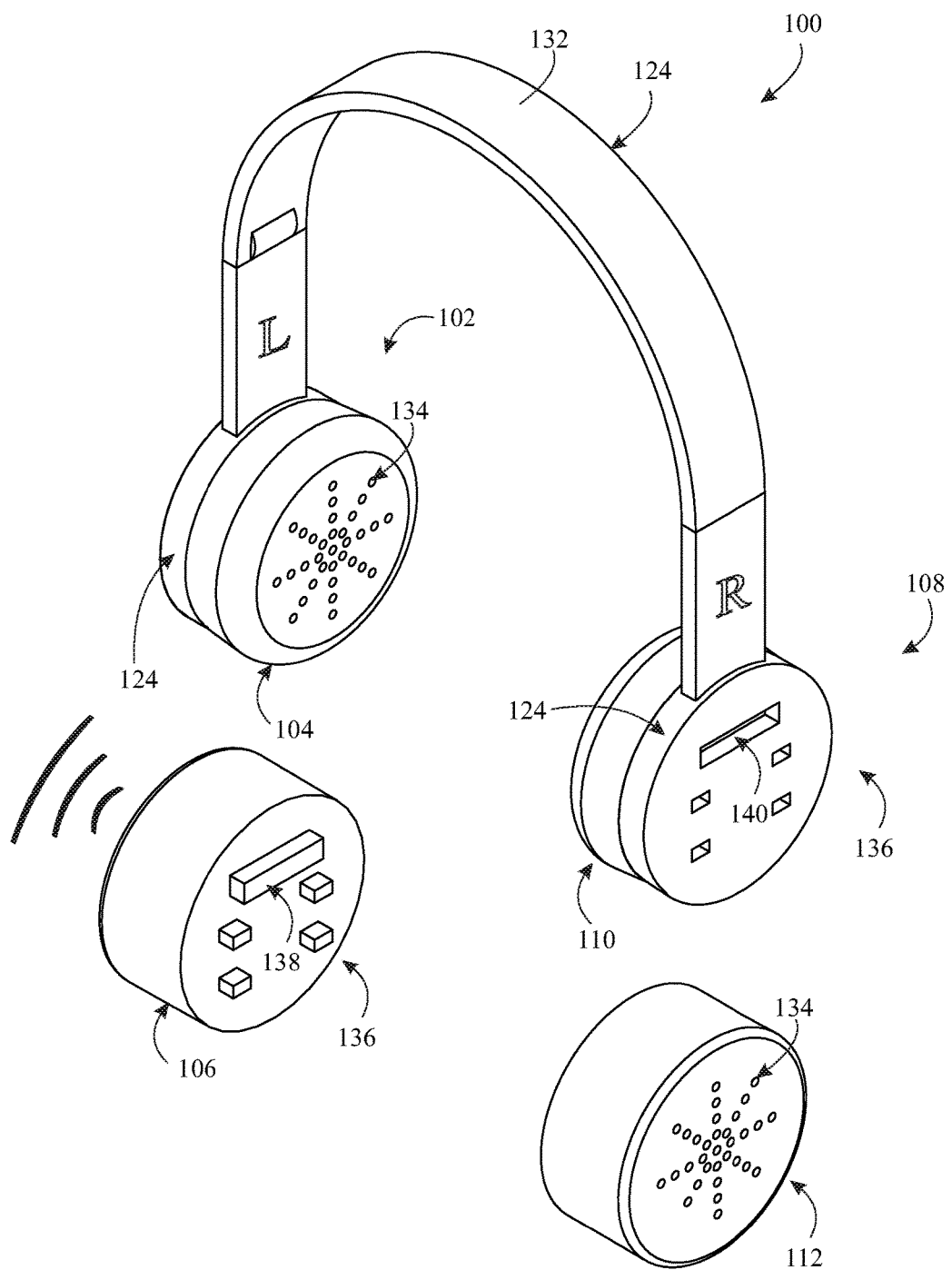
FIG. 5 presents an isometric front top view of the headset of FIG. 1, showing a left detached speaker assembly playing audio as a portable speaker, in accordance with the disclosure.

In some embodiments, at least one or both of the inner speaker assemblies may be fixedly attached to the support structure 124 and at least one or both of the outer speaker assemblies may be detachably securable to the support structure 124 such that the at least one or both of the outer speaker assemblies may be configured to play audio in a detached state. For example, FIG. 4 shows the outer speaker assemblies 106 and 112 in a detached state, detached from the support structure 124, and FIG. 5 shows at least one outer speaker assembly 106 playing audio as a portable loudspeaker in a detached state.

In some embodiments, at least one or both of the outer speaker assemblies may be fixedly attached to the support structure 124 and at least one or both of the inner speaker assemblies may be detachably securable to the support structure 124, the at least one or both of the inner speaker assemblies being configured to play audio in a detached state. For example, the inner speaker assemblies may be detached to function as one or more portable loudspeakers.

In some embodiments, at least one or both of the earpieces may be detachably securable to the support structure 124, the at least one or both of the earpieces being configured to play audio in a detached state. For example, one or more earpieces may be detachable to function as one or more portable loudspeakers.

In some embodiments, at least one or both of the outer speaker assemblies may be fixedly attached to the inner speaker assemblies.

In embodiments where a detachably securable speaker assembly includes the chargeable power bank, the detachably securable speaker assembly detaches as a portable charger.

As such, disclosed is a convenient and effective headset that plays audio privately and/or as a loudspeaker, that is configured to charge an external electronic device, and that includes detachable components that in a detached state provide loudspeaker functionality and/or portable charging functionality.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. A headset for playing audio and charging an external electronic device, the headset comprising:
    a first earpiece including a first inner speaker and a first outer speaker;
    a second earpiece including a second inner speaker;
    a selector operable to select play modes, the play modes including a first play mode and a second play mode;
    the first play mode being configured to play audio via the inner speakers;
    the second play mode being configured to play audio via the outer speaker;
    a chargeable power bank being configured to provide power through a power output jack; and
    wherein the outer speaker is fixedly attached to a support structure and at least one of the inner speakers is detachably securable to the support structure, the at least one of the inner sneakers being configured to play audio in a detached state.

2. The headset of claim 1, wherein at least one of the inner speakers is fixedly attached to a support structure and the outer speaker is detachably securable to the support structure, the outer speaker being configured to play audio in a detached state.

3. The headset of claim 1, wherein at least one of the earpieces is detachably securable to a support structure, the at least one of the earpieces being configured to play audio in a detached state.

4. The headset of claim 1, wherein the outer speaker is fixedly attached to at least on of the inner speakers.

5. The headset of claim 1, wherein at least one of the inner speakers is fixedly attached to a support structure, the chargeable power bank and the power output jack being detachably securable to the support structure.

6. The headset of claim 1, wherein at least one of the inner speakers is fixedly attached to a support structure and the outer speaker is detachably securable to the support structure, the outer speaker including the chargeable power bank and the power output jack.

7. The headset of claim 1, wherein the outer speaker is fixedly attached to a support structure and at least one of the inner speakers is detachably securable to the support structure, the at least one of the inner speakers including the chargeable power bank and the power output jack.

8. The headset of claim 1, wherein at least one of the earpieces includes the chargeable power bank and the power output jack.

9. The headset of claim 1, wherein at least one of the earpieces is detachably securable to a support structure, the at least one of the earpieces including the chargeable power bank and the power output jack.

10. The headset of claim 1, further comprising:
a wireless communicator being configured to wirelessly receive audio signals.

11. The headset of claim 1, wherein the power output jack is a USB receptacle.

12. A headset for playing audio and charging an external electronic device, the headset comprising:
a support structure;
a first earpiece including a first inner speaker assembly and a first outer speaker assembly;
a second earpiece including a second inner speaker assembly and a second outer speaker assembly;
a selector operable to select play modes, the play modes including a first play mode and a second play mode;
the first play mode being configured to play audio via the inner speaker assemblies;
the second play mode being configured to play audio via the outer speaker assemblies;
a chargeable power bank being configured to provide power through a power output jack; and
wherein the inner speaker assemblies are fixedly attached to the support structure and the outer speaker assemblies are detachably securable to the support structure, at least one of the outer speaker assemblies being configured to play audio as a portable speaker in a detached state, at least one of the outer speaker assemblies including the chargeable power bank and the power output jack.

13. The headset of claim 12, wherein the outer speaker assemblies are fixedly attached to the support structure and the inner speaker assemblies are detachably securable to the support structure, at least one of the inner speaker assemblies being configured to play audio as a portable speaker in a detached state, at least one of the inner speaker assemblies including the chargeable power bank and the power output jack.

14. The headset of claim 12, wherein the earpieces are detachably securable to the support structure, at least one of the earpieces being configured to play audio in a detached state, at least one of the earpieces including the chargeable power bank and the power output jack.

15. The headset of claim 12, wherein the outer speaker assemblies are fixedly attached to the inner speaker assemblies.

16. The headset of claim 12, wherein at least one of the speaker assemblies is detachably securable to the support structure, the at least one of the speaker assemblies including a wireless communicator being configured to wirelessly receive audio signals for playing received audio signals via the at least one of the speaker assemblies.

17. A headset for playing audio and charging an external electronic device, the headset comprising:
a support structure, the support structure including a headband;
a first earpiece including a first inner speaker assembly and a first outer speaker assembly;
a second earpiece including a second inner speaker assembly and a second outer speaker assembly;
a selector operable to select play modes, the play modes including a first play mode and a second play mode;
the first play mode being configured to play audio via the inner speaker assemblies;
the second play mode being configured to play audio via the outer speaker assemblies; and
the inner speaker assemblies being fixedly attached to the support structure and the outer speaker assemblies being detachably securable to the support structure, at least one of the outer speaker assemblies being configured to play audio as a portable speaker in a detached state, at least one of the outer speaker assemblies including a chargeable power bank being configured to provide power through a power output jack.

18. The headset of claim 17, wherein at least one of the outer speaker assemblies includes a wireless communicator being configured to wirelessly receive audio signals for playing received audio signals via the at least one of the outer speaker assemblies as a portable speaker.

* * * * *